(12) United States Patent
Ohyama

(10) Patent No.: US 7,090,090 B2
(45) Date of Patent: Aug. 15, 2006

(54) CONTAINER FOR MICROWAVE OVEN COOKING

(75) Inventor: Yoshio Ohyama, Kanagawa-ken (JP)

(73) Assignee: News, inc., Tokyo (JP)

( * ) Notice: Subject to any disclaimer, the term of this patent is extended or adjusted under 35 U.S.C. 154(b) by 115 days.

(21) Appl. No.: 10/806,200

(22) Filed: Mar. 22, 2004

(65) Prior Publication Data
US 2004/0188442 A1    Sep. 30, 2004

(30) Foreign Application Priority Data
Mar. 24, 2003  (JP) .............................. 2003-080257
Jan. 5, 2004   (JP) .............................. 2004-000509

(51) Int. Cl.
*B65D 51/16* (2006.01)
(52) U.S. Cl. .............................. 220/367.1; 220/203.09; 220/203.29; 220/254.7; 220/366.1; 220/573.1; 220/785
(58) Field of Classification Search ............. 220/367.1, 220/573.1, 203.01, 203.09, 360, 374, 203.29, 220/203.27, 203.23, 254.1, 366.1, 785, 254.7
See application file for complete search history.

(56) References Cited

U.S. PATENT DOCUMENTS

| | | | | | |
|---|---|---|---|---|---|
| 5,038,959 | A | * | 8/1991 | Patel ........................... | 220/368 |
| 5,121,858 | A | * | 6/1992 | Chong ......................... | 222/397 |
| 5,363,978 | A | * | 11/1994 | Molo ....................... | 220/254.3 |
| 5,750,967 | A | * | 5/1998 | Sprauer, Jr. ................. | 219/735 |
| 6,035,769 | A | * | 3/2000 | Nomura et al. ............... | 99/472 |
| 6,557,462 | B1 | * | 5/2003 | Wang ........................... | 99/472 |
| 6,789,690 | B1 | * | 9/2004 | Nieh et al. .................. | 220/231 |

FOREIGN PATENT DOCUMENTS

JP          3009863          12/1999

* cited by examiner

*Primary Examiner*—Nathan J. Newhouse
*Assistant Examiner*—Niki M. Eloshway
(74) *Attorney, Agent, or Firm*—Howson and Howson (57) ABSTRACT

A container system for microwave oven cooking comprises a main body, a lid, and a cap disposed in a recess in the lid. The cap is movable upward and downward through a limited range in the recess depending on steam pressure, and grooves, formed in a side wall of the cap, or in a side wall of the recess, allow escape of steam when the cap is moved upward as a result of steam pressure. The lid is also allowed to move upward and downward relative to the main container body in response to steam pressure, and, when the lid is moved upward, an additional path for the escape of stem is provided at the location where the rims of the lid and main body meet each other.

10 Claims, 13 Drawing Sheets

FIG. 3(b) enlarged view of A

FIG. 3(c) enlarged view of B

FIG. 8(b) enlarged view of A

FIG. 8(c) enlarged view of B

FIG. 9(a)

(cap 3 in up state)

FIG. 9(b)

(cap 3 in down state)

steam & steam pressure (cap 3 in up state)

FIG. 10(b)

steam & steam pressure (cap 3 in down state)

CONTAINER FOR MICROWAVE OVEN COOKING

FIELD OF THE INVENTION

This invention relates to a container for microwave oven cooking, and more particularly to a food container having a lid capable of automatically releasing heated expanded steam.

BACKGROUND OF THE INVENTION

Microwave ovens are conventionally used for convenient and easy heating of food and drink. A container, made of heat-resistant plastic sheet, and having a hermetically sealed lid, is widely used for microwave heating of fresh food as well as processed food. Food and drink can be packaged in such a container, and can be easily heated and cooked without removal of from the container.

Known microwaveable containers, having hermetically sealed lids, and capable of withstanding temperatures of around 120° C., release expanded steam generated through a hole cut in the top or in the rim of the lid, or through a slit cut in a part of lid. Expanded steam may also be released through a concave groove in the fitting section of the body of the container when the lid is in place. Such a container is described in Japanese Patent No. 3009863.

Problems are encountered with these conventional microwaveable food containers, especially when they are used for full-fledged cooking. The lid may be forced off the container body by steam pressure, or liquid may splash out of the container through the concave groove in the fitting section, making a mess inside the microwave oven, reducing the amount of liquid in the container, and resulting in either inadequate or excessive cooking.

Containers of the prior art have a structure suitable for warming foods, but are generally unsuitable for cooking food when the container is filled with water or broth, which is generally a requirement for cooking fresh food. Small openings or the like may be provided in a part of the container, but such openings may cause another problem in that they permit the entry of dust or dirt into the container.

An object of this invention is to overcome the above problems, and to provide a food container for microwave oven cooking, made of plastic sheet, in which processed food can be preserved and conveyed in a sealed condition, in which steam pressure can be controlled, which prevents broth from boiling over during heating and cooking, and which achieves a quality of cooking equivalent to that achieved using conventional cooking utensils such as a pot, a pressure cooker, or a caldron or the like, heated by a gas flame or an electric heater. More particularly, the invention achieves the same cooking result as achieved in conventional cooking when the heat is repeatedly adjusted from a high to a medium or low flame, and the position of the pot lid is adjusted relative to the pot in order to prevent broth from boiling over when food and broth, or cold or hot water are heated by conduction from a gas burner, electric element or the like.

SUMMARY OF THE INVENTION

The container for microwave oven cooking, in accordance with the invention comprises a main container body, a lid, and a cap providing an enclosure for containing food to be cooked.

The main container body has a bottom and a main body side wall extending upward from the bottom. The side wall has a main body rim.

The lid has a lid top, and a lid side wall extending downward from the lid top. The lid side wall has a lid rim engageable with the main body rim. The lid also has a recess formed in the lid top, and the recess has an opening.

The cap is received in the recess of the lid, and has a cap bottom, and a cap side wall having at least one section conforming to the shape of a part of the side wall of the recess, and engageable with that part of the side wall of the recess so that, when the cap is in a lowermost position in the recess, the opening of the recess is closed by the cap.

Interengageable elements on the lid and the cap for permit, but limit, upward movement of the cap relative to the lid resulting from steam pressure in the enclosure. At least one steam-releasing groove, formed in the side wall of the recess, or in the cap side wall, provides a path for the release of steam from the enclosure when the cap is moved upward relative to the lid by steam pressure within the enclosure. When the steam-releasing groove is formed in the side wall of the recess, it is preferably step-shaped.

The interengaging elements preferably comprise an inwardly projecting annular projection formed on the side wall of the recess, and an outwardly projecting projection formed on the side wall of the cap. The inwardly projecting annular projecting overlies, and is engageable with, the outwardly projecting projection when the cap is moved upward relative to the lid, and is spaced therefrom when the cap is in its lowermost position with the above-mentioned at least one section of the cap side wall engaged with the above-mentioned part of the side wall of the recess.

Interengageable elements may also be provided on the main container body and lid for permitting and limiting upward movement of the lid relative to said main container body as a result of steam pressure in the enclosure, and the main container body said lid may form a gap for the release of steam when the lid is moved upward relative to said main container body. In this case, the main body rim preferably comprises a shoulder extending laterally from the main body side wall, and a wall section extending upward from the shoulder at a location spaced laterally from the main body side wall. The rim of the lid comprises a shoulder-engaging section engageable with the shoulder of the main body rim, and the wall section has a first lateral projection, and the lid has a second lateral projection underlying the first lateral projection, and spaced therefrom by a distance permitting limited upward movement of the lid relative to the main container body as a result of steam pressure.

In a preferred embodiment, the height of the lid is at least as great as the height of the container main body and the bottom of the cap is concave when viewed from the bottom.

When steam pressure rises in the container, the cap and/or the lid automatically shift upward, and steam generated inside the container system is released through the lid opening and the steam-releasing groove or grooves, and/or through gap between a main container body and the lid. The lid is prevented from coming off the container as a result of steam pressure, and the boiling over of liquid, and a resultant mess inside the microwave oven, are also avoided. In addition, after heating and cooking are completed, the pressure inside the container falls, and the cap returns automatically to the same closed condition as before cooking commenced, and the main body and lid are also fitted to each other just as they were before cooking commenced. Therefore, spillage of liquid is avoided, and the entry of dirt or dust into the container is also prevented. Especially when the grooves are formed in the cap, the container system can be produced easily. Its shape is relatively simple, and thus, it can be molded from plastics, and readily removed from the mold.

DETAILED DESCRIPTION OF THE PREFERRED EMBODIMENTS

Figure 1:
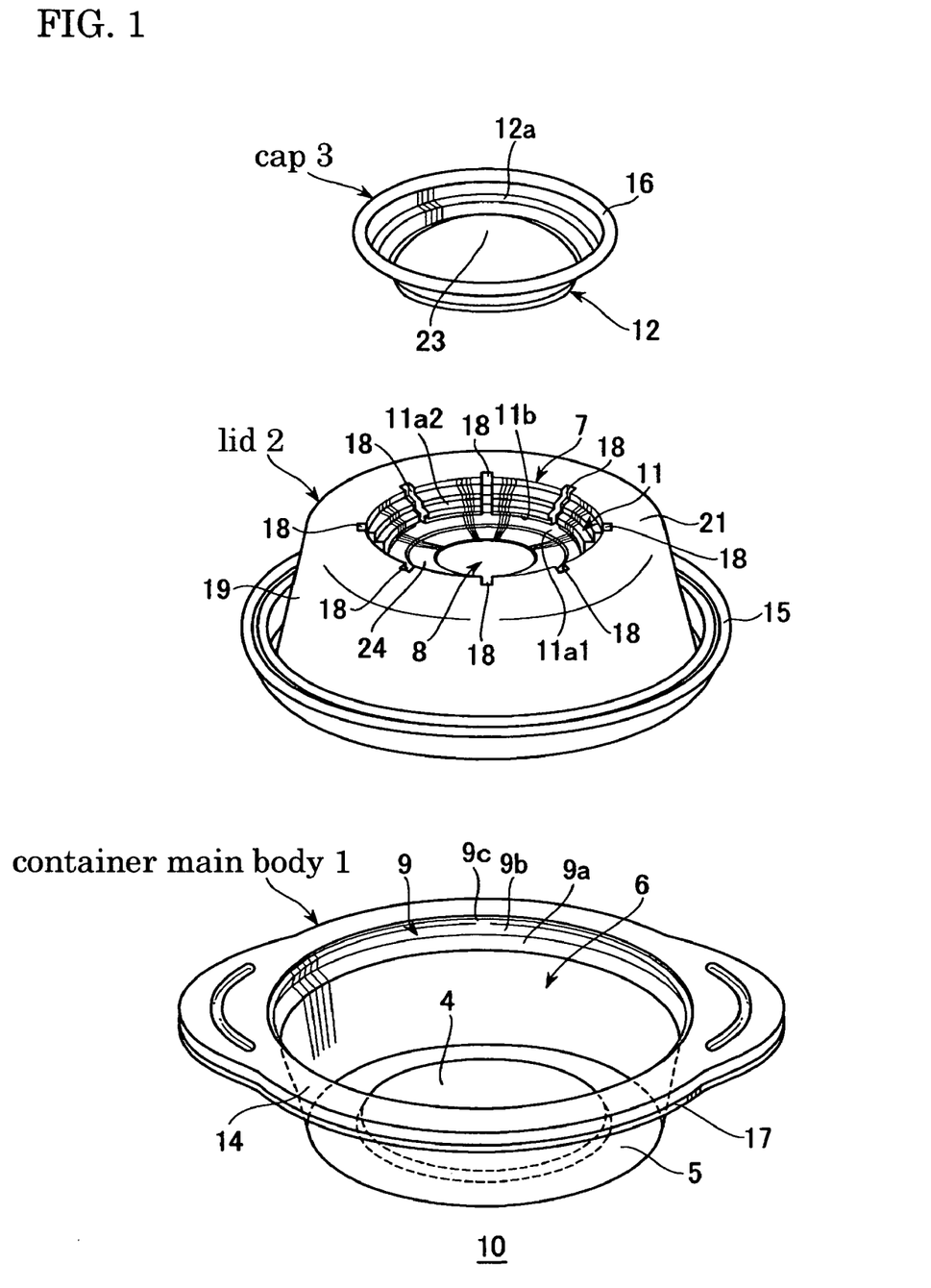
FIG. 1 is an exploded perspective view of a container system for microwave oven cooking according to a first embodiment of the invention.
Figure 2:
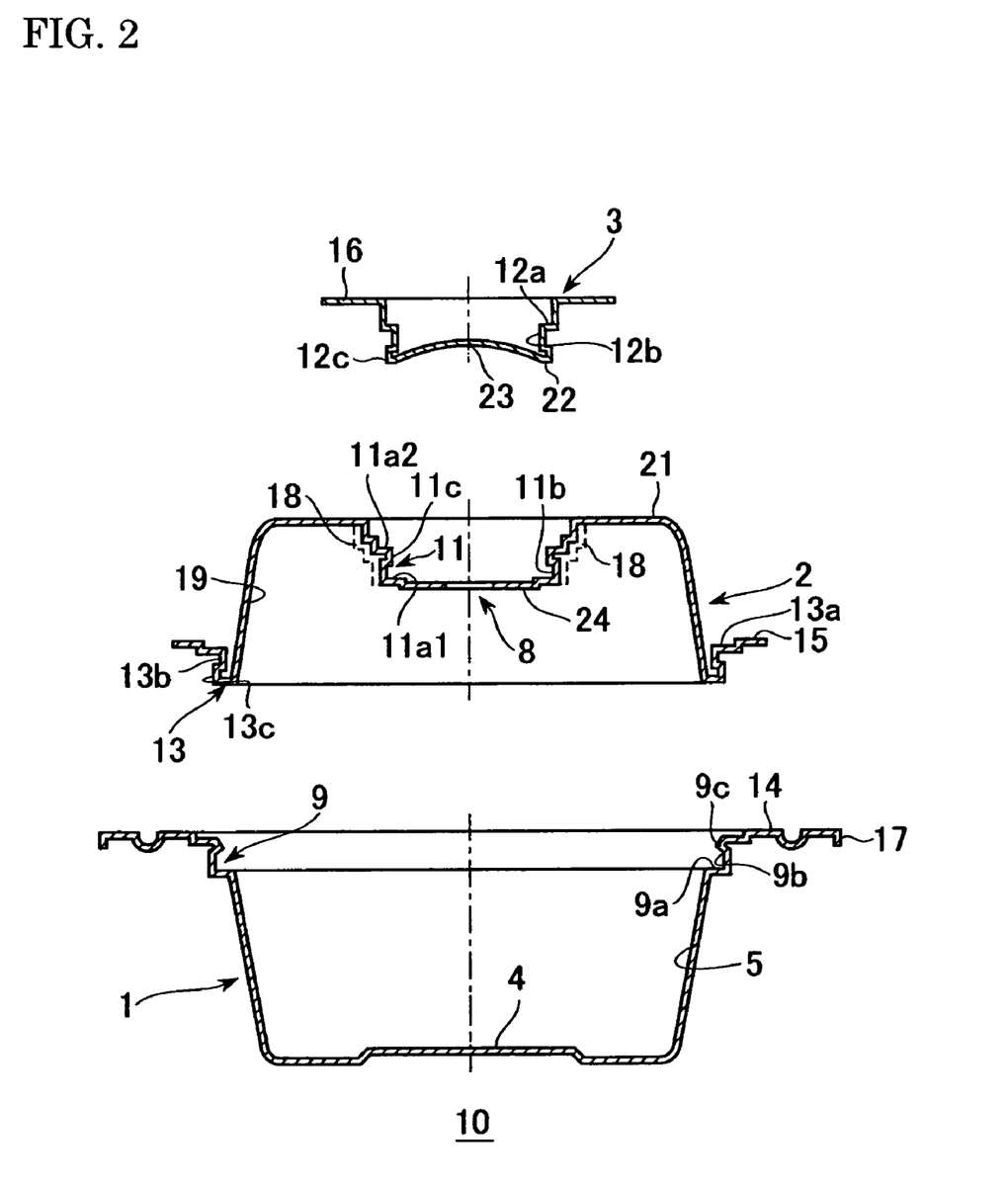
FIG. 2 is a cross-sectional view showing the three main components of the container system of FIG. 1.

In the first embodiment, as shown in FIGS. 1 and 2, the container 10 comprises a main body 1, a lid 2, and a cap 3. The upper part of the main body 1 has an annular internal shoulder, forming a fitting section 9 for receiving an annular lower part 13 of the lid 2. A central recess 7 is formed in the upper part of the lid for receiving the cap 3. The cap has an annular cap fitting section 12. The annular lower part 13 and the annular cap fitting section 12 are respectively fitted into the fitting section 9 and the lid recess 7. The lid recess 7 has a central opening 8 and steam-releasing grooves 18 formed in its side wall.

The recess 7 is in the form of a stepped cone. When the cap 3 is received in recess 7, and the annular lower part 13 on the bottom of the lid is received in the fitting section 9 in the upper part of the main body 1, liquid is prevented from boiling over or spilling out. Preferably, the height of the lid 2 is equal to or greater than the height of the main body 1, and the downward face of the bottom part 23 of the cap 3 is concave.

When the assembled container 10 is heated in a microwave oven, with the cap 3 fitted into the lid recess 7, and food and broth in the container are heated to a boil, steam is generated and the pressure within the container begins to rise. The cap 3 is automatically pushed upward by a force proportional to the steam pressure, and steam is released from the container 10 through a gap between the lid top 21 and the cap flange 16. When heating is completed, and the temperature inside the container 10 falls the, internal pressure within the container will fall rapidly, and the cap, which was pushed upward by steam pressure, automatically drops into the recess in the lid 2, and the flange 16 re-engages the top 21 of the lid to seal the inside of the container 10 once again.

The main body 1, the lid 2, and the cap 3 may be formed by thermoforming methods such as pressure forming or vacuum forming, using plastic sheet with good heat resistance, such as oriented polystyrene (OPS), heat-resistant oriented polystyrene (heat-resistant OPS), or polypropylene.

The opening 6 of the main body 1 of the container is formed with a circumference slightly larger than the circumference of the container bottom 4, and the container sidewall 5 is generally frusto-conical in shape. The fitting section 9, which receives the annular lower part 13 of the lid, is provided by forming, on the upper part of the container wall 5, an annular shoulder or tier 9a, an annular side wall 9b, and an inwardly projecting annular section 9c. A flange 14, extending outward from the fitting section 9 by an appropriate distance, can be either curved or flat, and preferably has a short, downwardly folded outer edge 17. The shoulder or tier 9a, which is engaged by the annular lower part 13 of the lid 2, is preferably formed as a flat surface in order to fit the rim of the lid.

The top 21 of lid 2, is generally circular and the side wall 19 of the lid extends downward from the top 21. The annular lower part 13 comprises an engaging section 13c, a wall section 13b, a tier section 13a, and a flange 15. The wall section 13b is folded upward from the engaging section 13c in order to fit the side wall 9b below the inwardly projecting annular section 9c of the main body 1. The lid tier section 13a and the flange 15 extend horizontally.

The tier 9a is continuous with, and extends outward from, the inner surface of wall 5 at the upper end of the wall. The tier 9a has a width sufficient to allow the annular lower part 13 of the lid 2 to be received thereon. The inwardly projecting annular section 9c is located above, and spaced from, tier 9a, by the height of side wall 9b. The top of annular section 9c defines an opening the inside diameter of which is smaller than the outside diameter of the circumferential edge of the lid. The flange 14 is continuous with, and extends outward from, the top of annular section 9c. When the lid 2 fitted to the container body 1, it is supported on tier 9a. Steam or boiled broth will not spill over between the container body 1 and the lid 2.

Figure 3A:
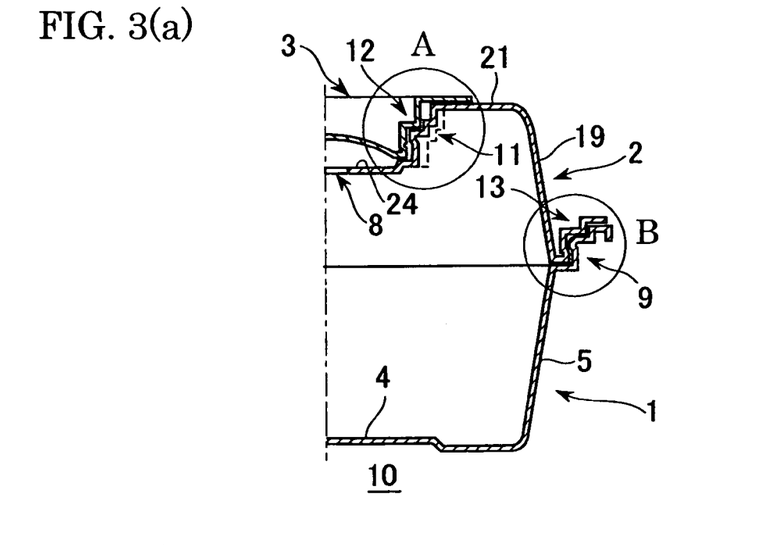
FIG. 3(a) is a fragmentary cross-sectional view showing the components of FIG. 2 fitted together
Figure 3B:
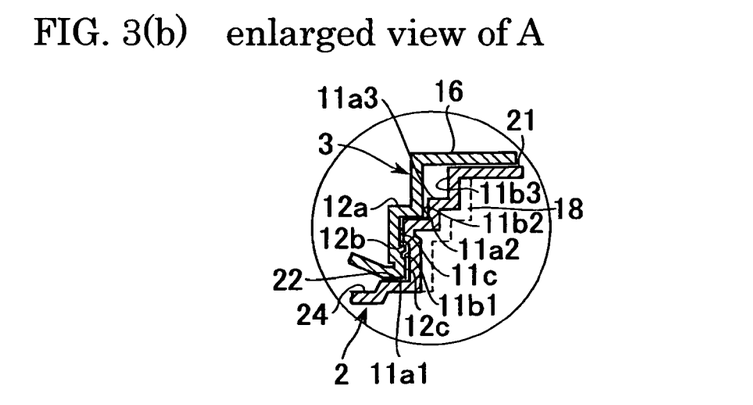
FIGS. 3(b) and 3(c) are enlarged cross-sectional views showing details of parts seen in FIG. 3(a)
Figure 3C:
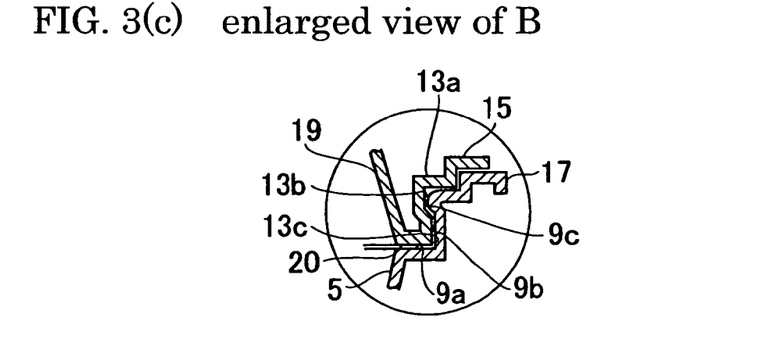

As shown in FIGS. 3(a), 3(b) and 3(c) the lid 2 and a cap 3 are formed to achieve automatic control of the pressure of the steam generated by heat in the container 10. As shown in FIGS. 1 and 2, concave steam-releasing grooves 18 are formed in the stepped, cone-shaped recess of the lid. These grooves extend from the surface 24 surrounding the lid opening 8 to the top of the lid, that is, from the lid tier 11a1 (FIG. 3b) to a wall section 11b1, an annular projection 11c, a tier 11a2, a wall section 11b2, another tier 11a3, a wall section 11b3, and the lid top 21. When the cap 3 is fitted into the lid 2, these tiers 11a1, 11a2, 11a3, the wall sections 11b1, 11b2, and 11b3, the annular projection 11c, and the lid top 21, closely fit sections of the cap, namely, a folded rim 22, an engaging section 12c, a wall section 12b, a tier 12a, and a flange 16.

Figure 4A:
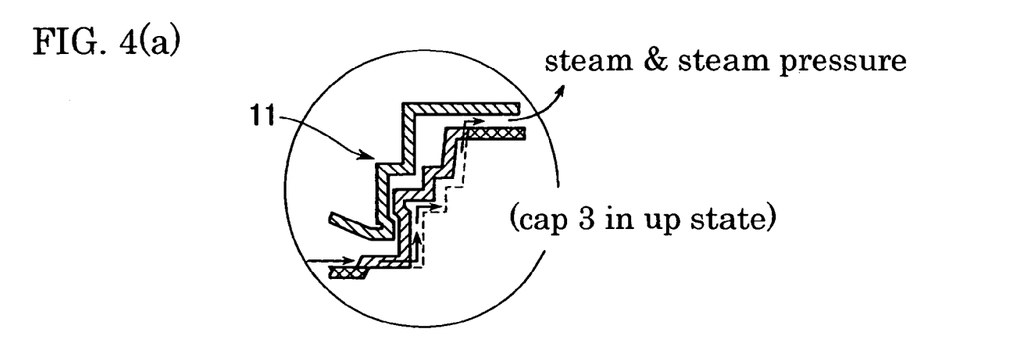
FIGS. 4(a) and 4(b) are enlarged cross-sectional views the cap of the container system respectively in an "up" position and in a "down" position.
Figure 4B:
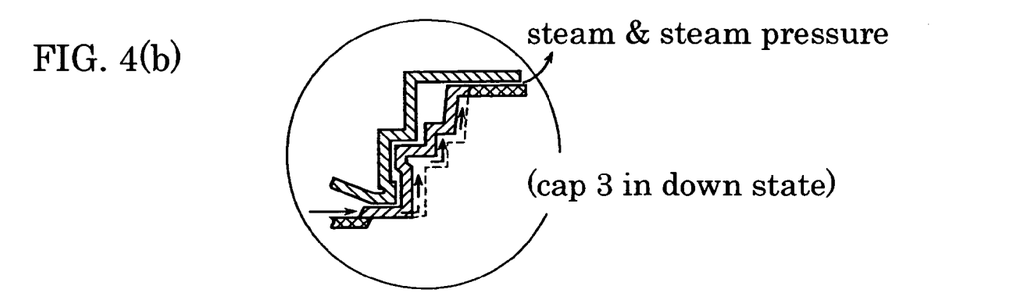
Figure 4C:
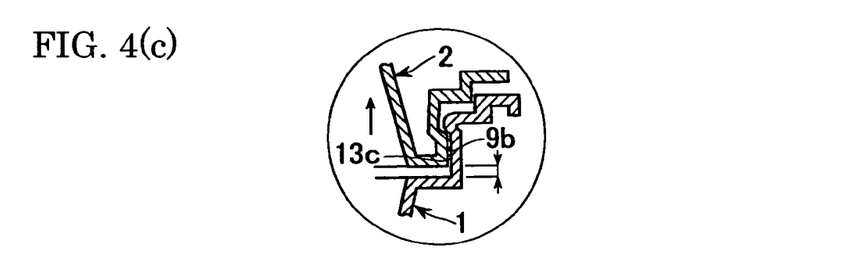
FIGS. 4(c) and 4(d) are enlarged cross-sectional views the lid of the container system respectively in an "up" position and in a "down" position.
Figure 4D:
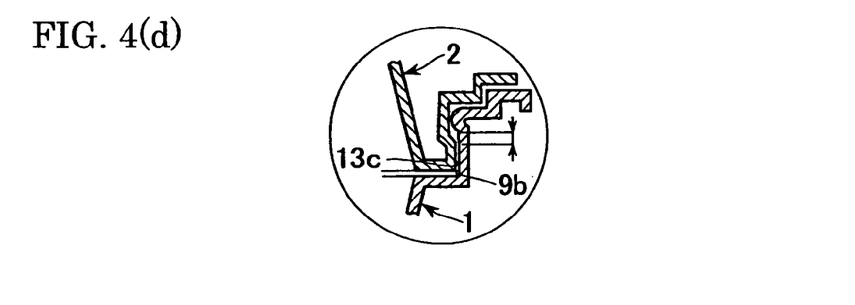
Figure 5A:
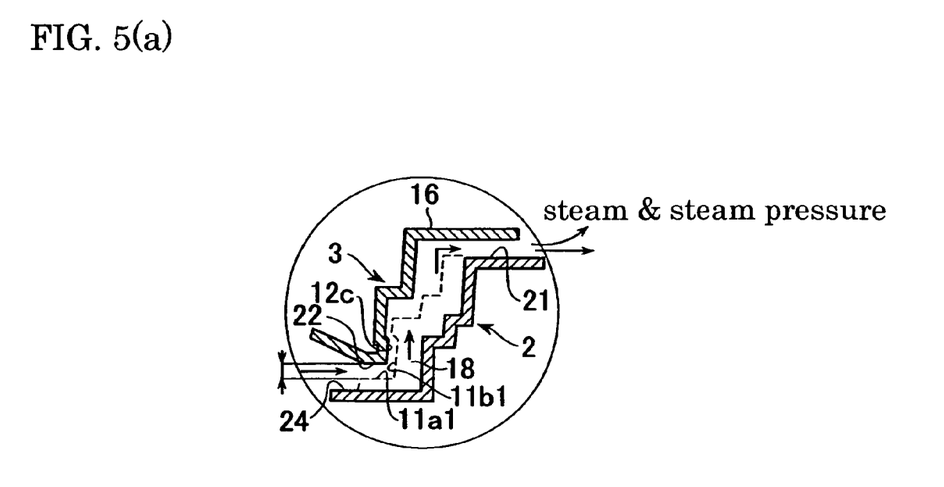
FIGS. 5(a) and 5(b) are enlarged cross-sectional views at the location of a lid steam-releasing groove, which show a cap respectively in its "up" and "down" positions.
Figure 5B:
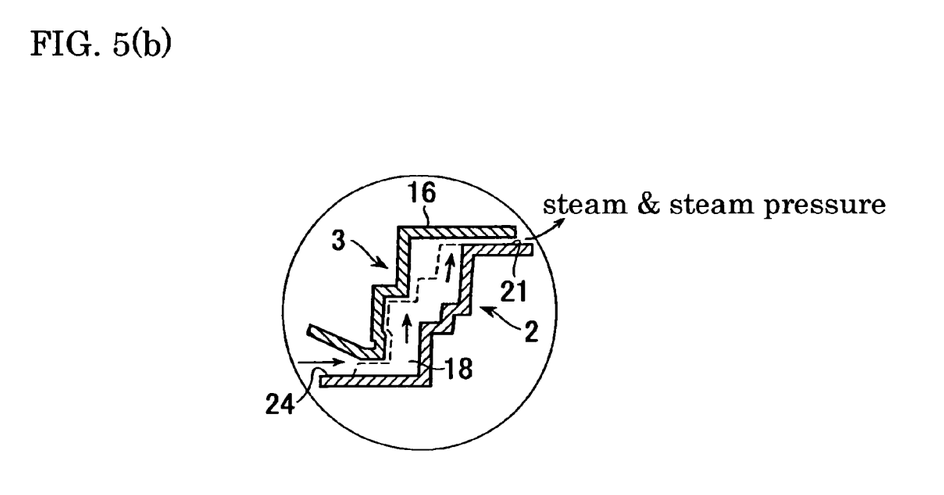

When the amount of steam generated in the container 10 is comparatively small, the steam is released outward through the concave lid steam-releasing grooves 18 and through a gap between the cap flange 16 and the lid top 21 while the cap 3 fits into the lid 2 in the position shown in FIG. 4(b). The amount of steam generated and its rate of expansion vary depending on the food content in the container 10, and it is preferable not to have the cap 3 withstand 100% of the pressure, especially when it is applied suddenly due to the energy of the expanding steam. As shown in FIG. 4(c), the side wall 9b of the fitting section 9, formed at the rim of the main container body 1, is a few millimeters longer than the engaging section 13c of the lid 2. Consequently, the lid responds to the steam pressure by moving upward and downward relative to the container body 1, and the force applied to the cap 3 is reduced.

The wall section 11b1 of the lid is a few millimeters higher than the cap engaging section 12c as shown in FIGS. 3(b), 4(a), 4(b), 5(a) and 5(b). When the amount of steam generated in the container is comparatively large, the steam passing through the central lid opening 8 applies a force to the cap bottom 23 and moves the cap 3 upward by a few millimeters until the cap engaging section 12c is stopped by engagement with the annular projection 11c. When the cap is lifted in this manner, its flange 16 moves away from the lid top 21, providing a larger aperture for the release of steam.

Although it is possible to provide only a single steam-releasing groove, preferably plural steam-releasing grooves 18 are provided, and disposed at even intervals on the inside of the lid recess 7. In addition, while it is possible to provide only a single lid tier, such as 11a1, without a wall section corresponding to 11b1, it is desirable to provide two or more wall sections, each having an appropriate height so that the inside of the container 10 is sealed securely when the cap is fitted in the lid upper fitting section 11. The container fitting section 9 formed at the rim of the container main body 1 has a structure similar to that of the fitting section 11. Thus, when the lid 2 is fitted to the container body 1, the container tier 9a, the container wall section 9b, the annular projection 9c, and the container flange 14, are closely fitted to the folded rim 20 of the lid (see FIG. 3(c)), the engaging section 13c, the wall section 13b, tier 13a, and the lid flange 15.

A second embodiment of a container system for microwave oven cooking according to the invention will be explained referring to FIGS. 6–10. Where elements in the second embodiment are the same as those of the first embodiment, the same reference numerals are used, and explanation may be omitted.

Figure 6:
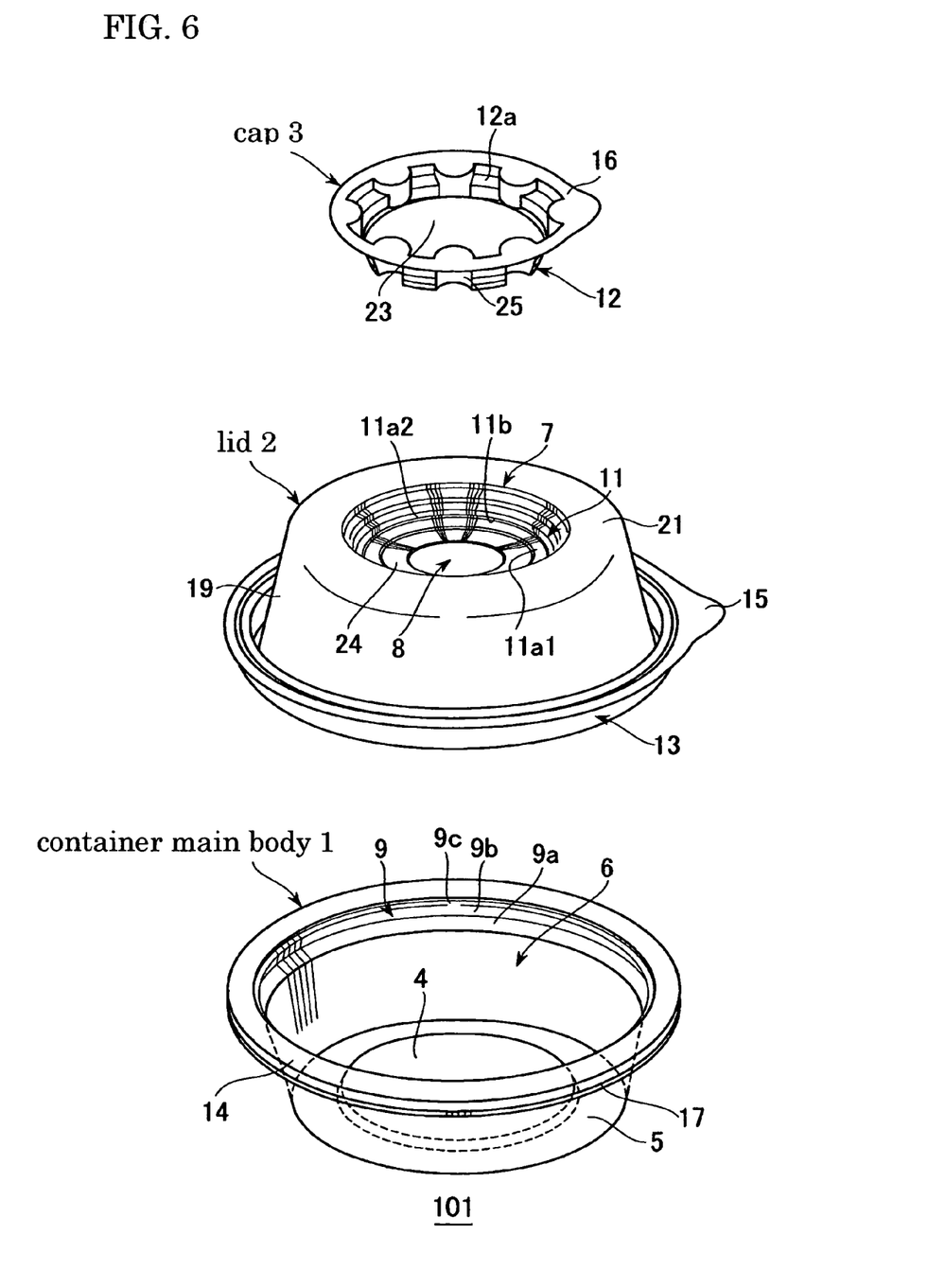
FIG. 6 is an exploded perspective view of a container system for microwave oven cooking according to a second embodiment of invention.
Figure 7:
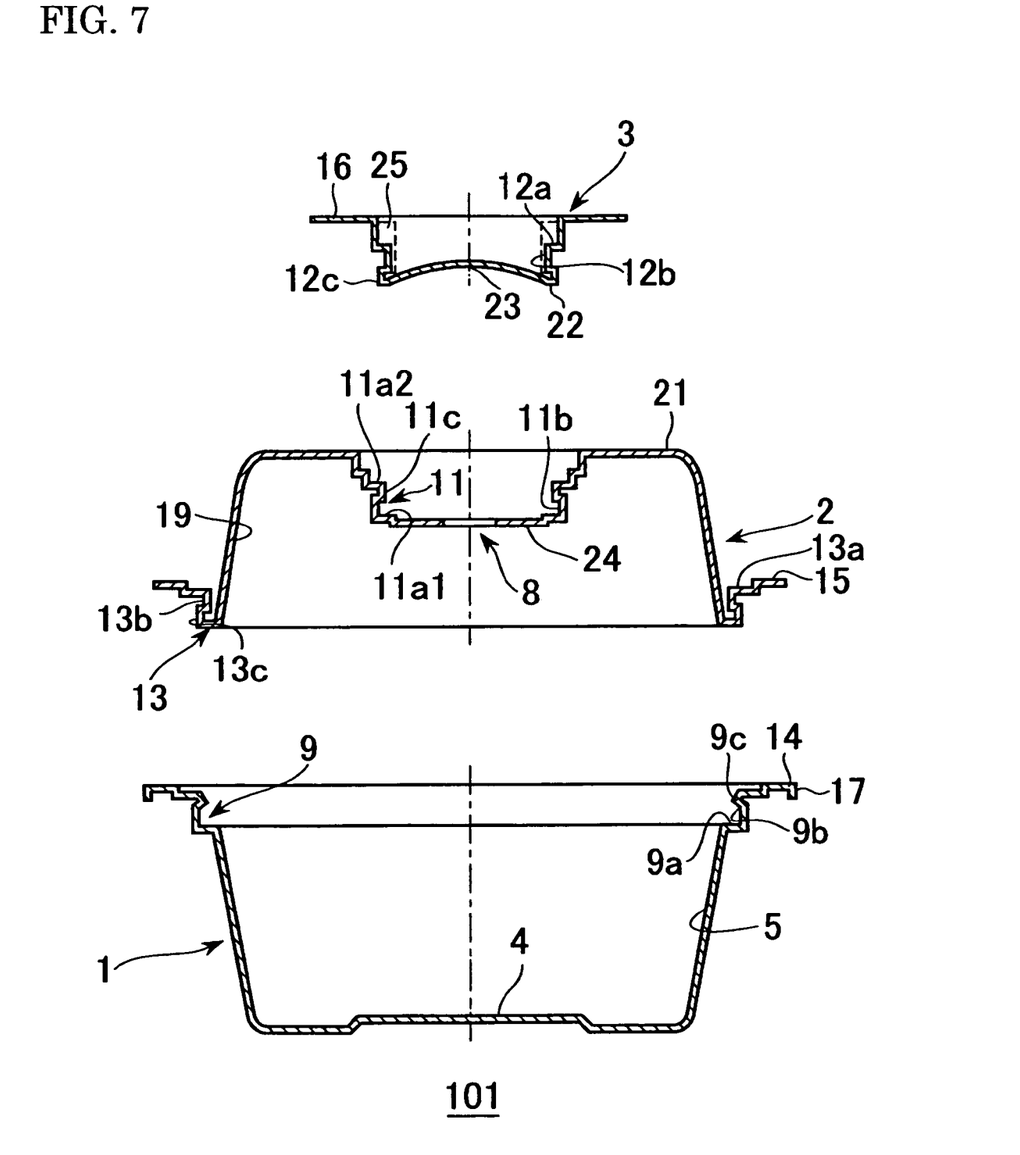
FIG. 7 is a cross-sectional view showing the three main components of the container system of FIG. 1.

Referring to FIGS. 6 and 7, a container 101 comprises a main body 1, a lid 2, and a cap 3. The main body 1 has a fitting section 9 in its upper part. The lid 2 has a fitting section 13 in its lower part and a recess 7 in its upper part. In this embodiment, steam release grooves 25 are formed on the outside of the cap below the cap fitting section 12, instead of in the wall of the recess as in the first embodiment. The fitting section 13 of the lid, and the fitting section 12 of the cap, are respectively fitted into the fitting section 9 and the lid recess 7. The lid recess 7 has a central opening 8.

The container according to the second embodiment not only has a superior steam-releasing function, but also has the advantage that it may be produced more easily in comparison to the container of the first embodiment. Its shape is relatively simple, and the components are easier to remove from a mold.

Figure 8A:
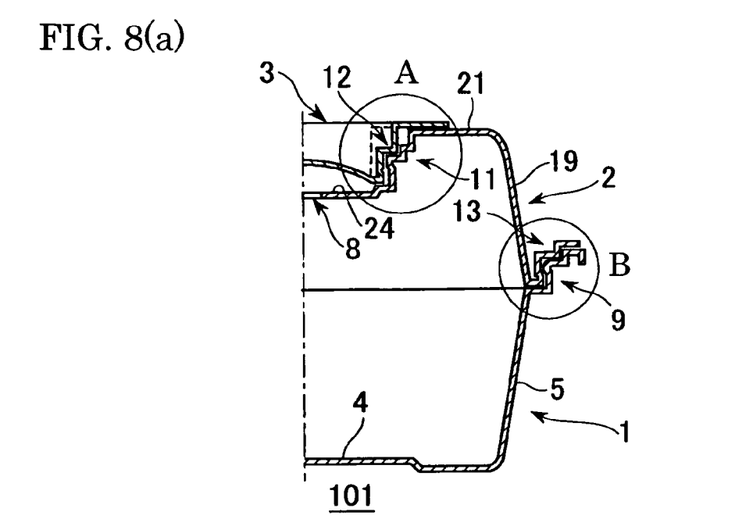
FIG. 8(a) is a fragmentary cross-sectional view showing the components of FIG. 7 fitted together
Figure 8B:
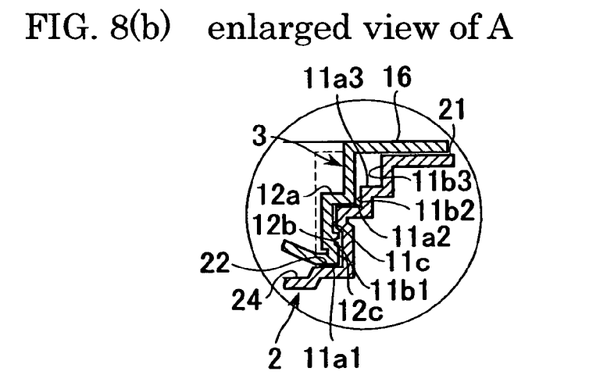
FIGS. 8(b) and 8(c) are enlarged cross-sectional views showing details of parts seen in FIG. 8(a)
Figure 8C:
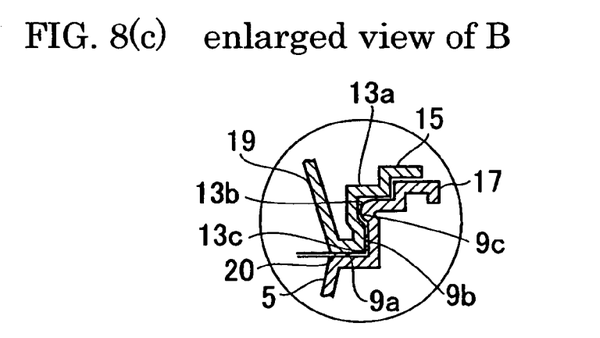

As shown in FIGS. 8(a)–8(c), a lid 2 and a cap 3 are formed to control the pressure of steam generated in container 101. On the cap 3 the steam-releasing grooves 25 are formed with appropriate widths, being separated from one another by parts of the cap fitting section. It is desirable that the cap steam-releasing grooves 25 are arranged at uniform intervals on the outer side of a cap 3.

Figure 9A:
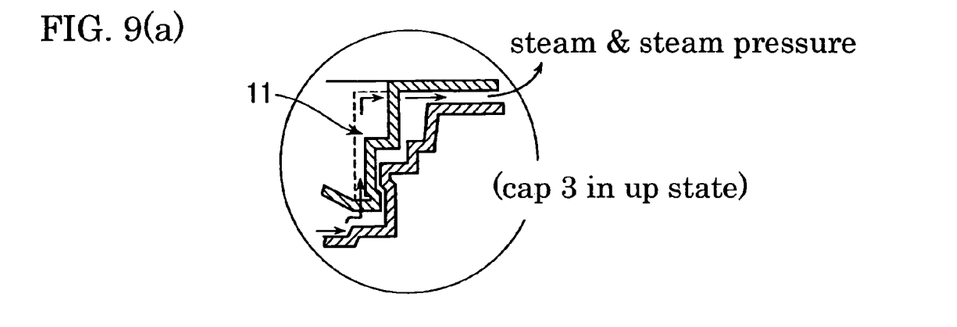
FIGS. 9(a) and 9(b) are enlarged cross-sectional views the cap of the container system of FIG. 7 respectively in an "up" position and in a "down" position.
Figure 9B:
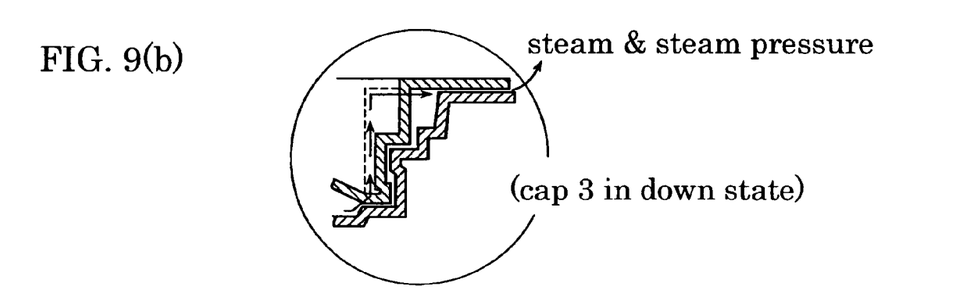
Figure 9C:
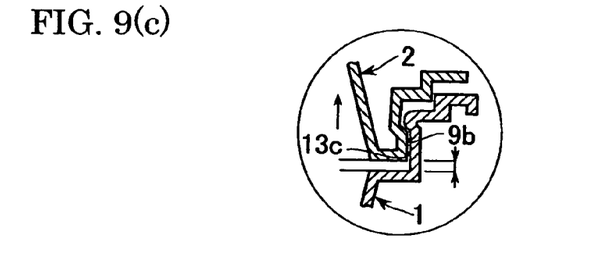
FIGS. 9(c) and 9(d) are enlarged cross-sectional views the lid of the container system of FIG. 7 respectively in an "up" position and in a "down" position.
Figure 9D:
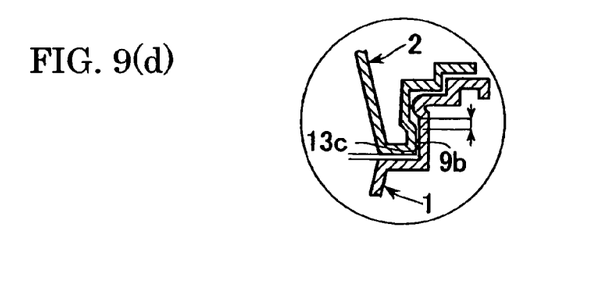
Figure 10A:
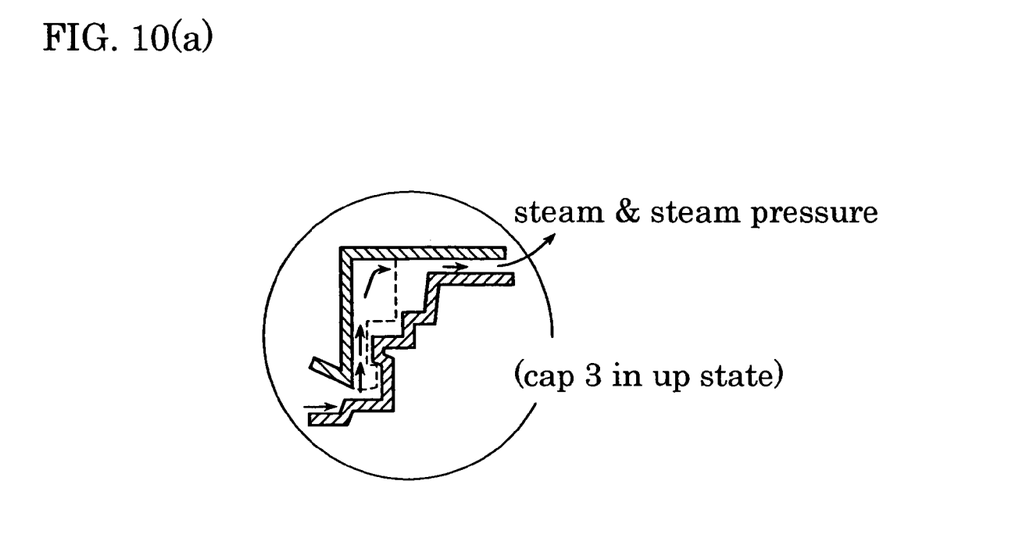
FIGS. 10(a) and 10(b) are enlarged cross-sectional views at the location of a lid steam-releasing groove in the container system of FIG. 7, which show a cap respectively in its "up" and "down" positions.
Figure 10B:
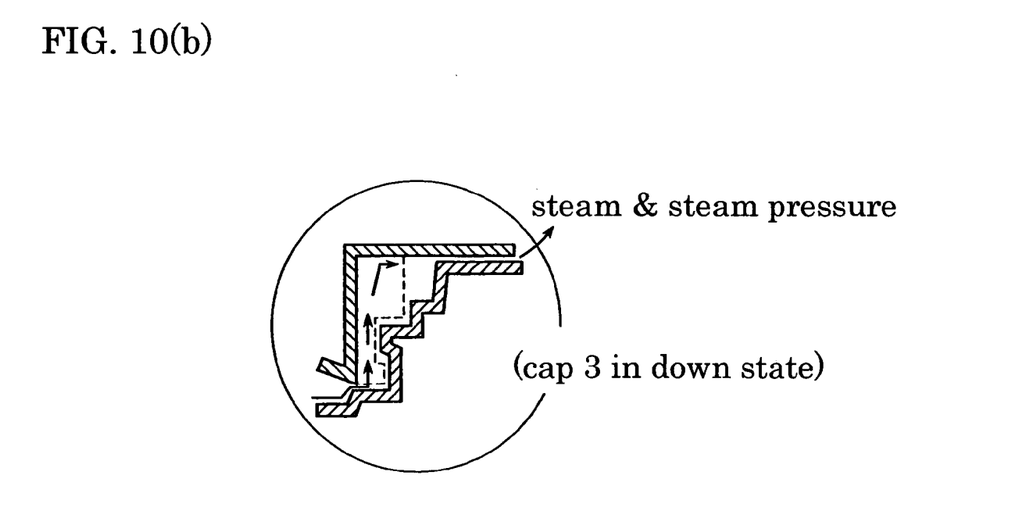

When the amount of the steam generated in the container 101 is comparatively small, the steam is released outward through the concave steam-releasing grooves 25 in the cap, and through a gap between the cap flange 16 and a lid top 21 while the cap is fitted into the lid 2 as shown in FIG. 9(b). However, the amount of steam and its expansion rate vary depending on the food content in the container, and it is preferable not to have the cap 3 withstand 100% of the pressure, especially when it is applied suddenly due to the energy of the expanding steam. As shown in FIG. 9(c), the lid 2 can move up and down relative to the main container body 1. Consequently, the lid responds to the steam pressure by moving upward and downward relative to the container body 1, and the force applied to the cap 3 is reduced.

The wall section 11b1 of the lid is a few millimeters higher than the cap engaging section 12c as shown in FIGS. 8(b), 9(a), 9(b), 10(a) and 10(b). When the amount of steam generated in the container is comparatively large, the steam passing through the central lid opening 8 applies a force to the cap bottom 23 and moves the cap 3 upward by a few millimeters until the cap engaging section 12c is stopped by engagement with the annular projection 11c. When the cap is lifted in this manner, its flange 16 moves away from the lid top 21, as shown in FIG. 9(a), providing a larger aperture for the release of steam.

The flow of steam and the movement of broth inside a container according to the invention will be explained referring to FIGS. 11–14. FIGS. 11–14 show a container according to the first embodiment, but applies as well to a container according to the second embodiment.

Figure 11:
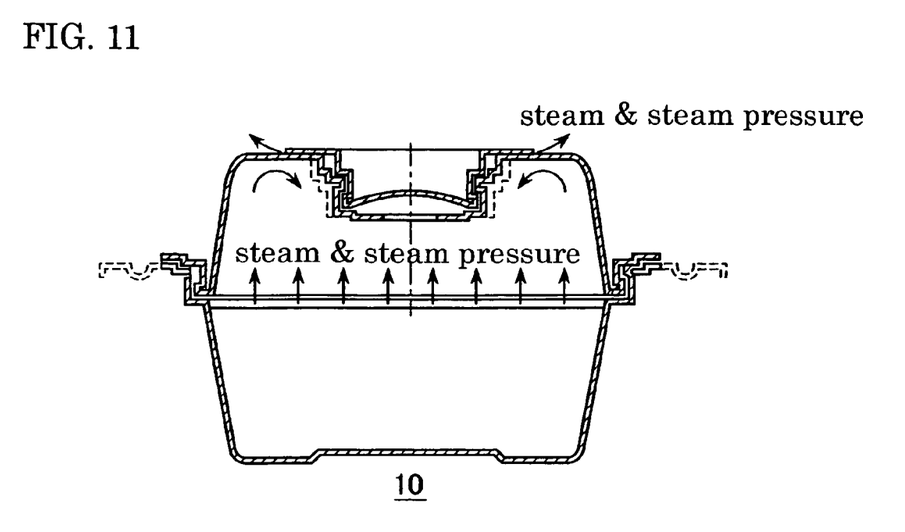
FIG. 11 is an explanatory schematic view illustrating the flow of steam in the case of a comparatively low steam pressure.
Figure 12:
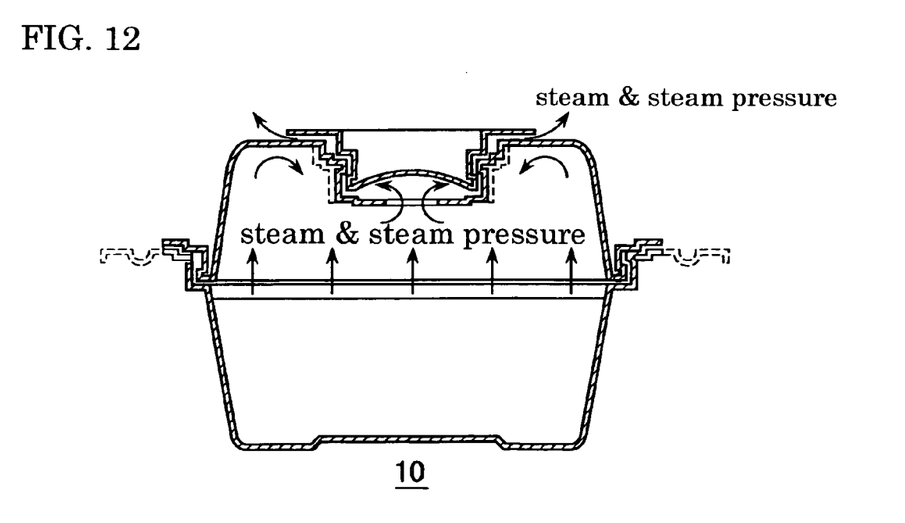
FIG. 12 is an explanatory schematic view illustrating the flow of steam in the case of a comparatively high steam pressure.

FIG. 11 shows the course of steam being released from the inside of a container 10 to the outside when the steam pressure is relatively small. FIG. 12 shows the course of steam released from the inside of the container 10 when the steam pressure is relatively high.

Figure 13:
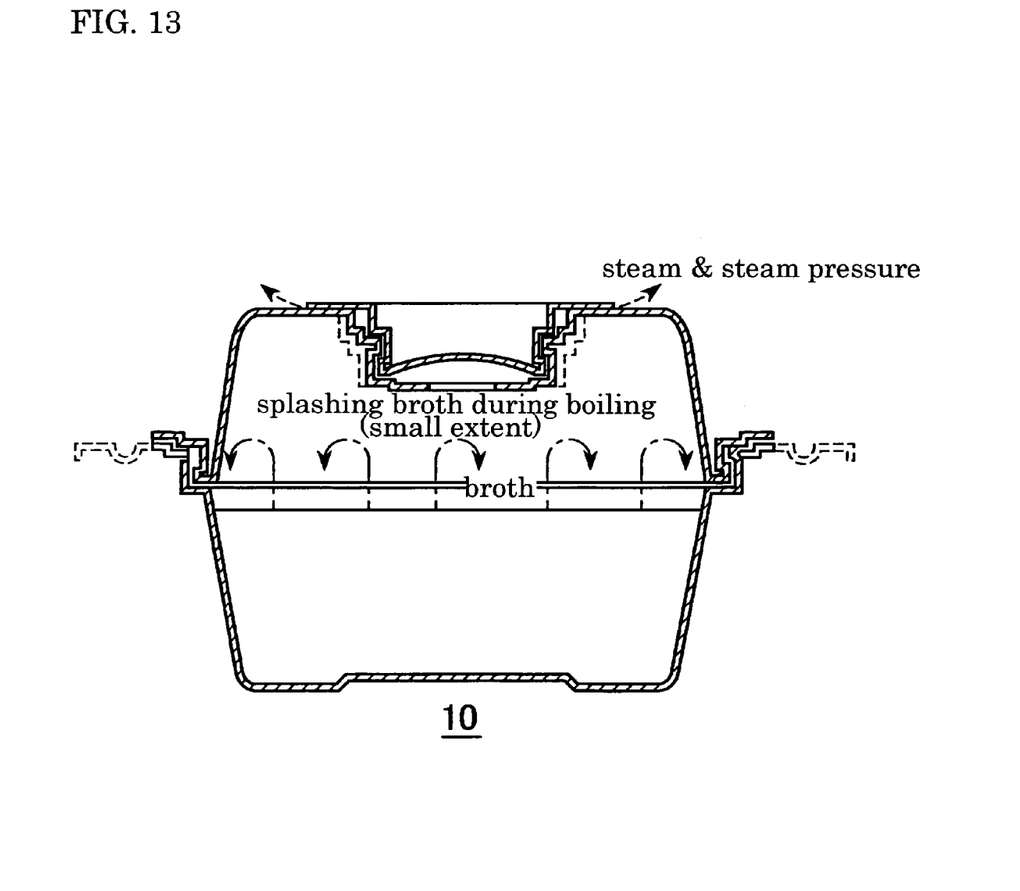
FIG. 13 is an explanatory schematic view illustrating the movement of broth and the flow of steam before the broth reaches its boiling point.
Figure 14:
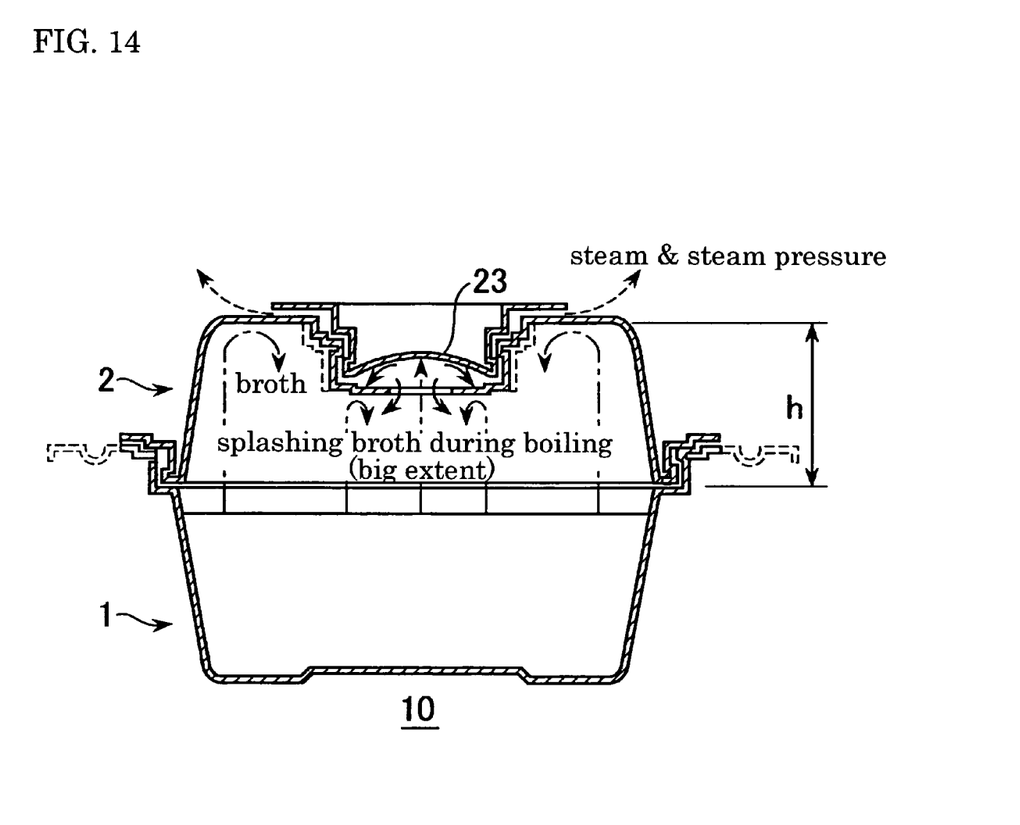
FIG. 14 is an explanatory schematic view illustrating the movement of broth and the flow of steam after the broth reaches its boiling point.

FIG. 13 illustrates the splashing of liquid inside the container 10, when the food or broth etc. is heated almost to the boiling point. FIG. 14 illustrates the splashing of liquid inside the container when the food or broth etc. reaching the boiling point.

As shown in FIG. 14, when the container 10 is heated, steam pressure inside the container 10 rises, and the rate and amount of food or broth splashing around becomes higher compared with the case where food is cooked in an ordinary pot. Therefore, it is desirable that the height h of the lid 2 be equal to or greater than the height of the main body 1, so that the temperature of the broth splashing and hitting the cap bottom 23 becomes 4–5 degrees ° C. lower than the temperature of the surface of the food or broth. The broth hitting the cap bottom is and drops downward. Therefore, none of the hot broth splashes out of the container 10.

The container according to the invention can be used not only to heat and cook foods with a large amount of broth, but can also be used to cook fresh food and processed food at the same time. In addition, since the main body 1 and the lid 2, and the lid 2 and the cap 3, are respectively fitted so that they will not come apart suddenly, spillage of broth or food to the outside of the container, and entry of dust and dirt into the container, can be avoided.

When food is put into the container 10, and heated in a microwave oven, steam is generated from the heated food and the pressure inside the container 10 gradually rises. However, steam is released effectively with a cap 3 being pushed up as shown in FIGS. 4 and 5. Therefore, steam pressure does not cause the lid 2 to comes off the main body 1 and does not cause the broth inside the container to splash out and cause a mess inside the microwave oven.

When the pressure inside the container 10 falls after heating is reduced or discontinued, the cap 3 automatically falls, and the container 10 becomes sealed once again. The lid 2, with the cap 3 fitted into its recess, may be removed from the main body 1 of the container, and the cooked food may be eaten.

As explained above, in the container system for microwave oven cooking according to the invention, when steam pressure rises, the cap and/or the lid automatically shifts upwards, and steam generated inside the container is released. Therefore steam pressure is prevented from causing the lid to come off the container and allowing broth to boil over and make a mess inside the microwave oven.

In addition, after heating and cooking, as a result of pressure reduction, the cap automatically returns to the same fitting relationship to the lid that it was in before cooking commenced. The main body and the lid, and the lid and the cap are respectively connected at their fitting sections as before cooking. Therefore, the container exhibits an outstanding ability to prevent broth or other liquid from spilling out of the container and an outstanding ability to prevent dirt or dust from entering the container, and contaminating the food therein.

Moreover, the container system, especially the container system according to the second embodiment of the invention, can be produced easily, since its shape is relatively simple, and its components can be easily molded from plastics and easily removed from the mold.

The invention claimed is:

1. A container for microwave oven cooking, comprising:
   a main container body having a bottom and a main body side wall extending upward from said bottom, said side wall having a main body rim;
   a lid having a lid top, a lid side wall extending downward from the lid top and having a lid rim engageable with said main body rim, said lid also having a recess formed in the lid top, the recess having a side wall and an opening;
   a cap received in said recess of the lid, said cap having a cap bottom, and a cap side wall, the cap side wall having at least one section conforming to the shape of a part of the side wall of the recess, and engageable with said part of the side wall of the recess whereby, when the cap is in a lowermost position in said recess, said opening of the recess of the lid is closed by said cap;
   said main container body, said lid and said cap providing an enclosure for containing food to be cooked;
   said cap being movable upward relative to the lid by steam pressure whenever the upward force exerted on the cap as a result of the pressure exerted by steam within said container exceeds the weight of said lid, and said cap being free to return to its said lowermost position in the recess when the steam pressure inside the container falls;
   interengageable elements on said lid and said cap for permitting and limiting upward movement of said cap relative to said lid as a result of steam pressure in said enclosure; and
   at least one steam-releasing groove formed in one of said side wall of the recess and said cap side wall, said groove providing a path for the release of steam from said enclosure when said cap is moved upward relative to said lid by steam pressure within said enclosure.

2. A container for microwave oven cooking as claimed in claim 1, wherein said steam-releasing groove is formed in the side wall of the recess.

3. A container for microwave oven cooking as claimed in claim 1, wherein said steam-releasing groove is formed in the cap side wall.

4. A container for microwave oven cooking as claimed in claim 1, in which said interengageable elements comprise an inwardly projecting annular projection formed on the side wall of the recess, and an outwardly projecting projection formed on the side wall of the cap, said inwardly projecting annular projecting overlying, and being engageable with, the outwardly projecting projection when the cap is moved upward relative to the lid, and being spaced therefrom when said at least one section of the cap side wall is engaged with said part of the side wall of the recess.

5. A container for microwave oven cooking as claimed in claim 1, in which the height of said lid is at least as great as the height of said container main body.

6. A container for microwave oven cooking, comprising:
   a main container body having a bottom and a main body side wall extending upward from said bottom, said side wall having a main body rim;
   a lid having a lid top, a lid side wall extending downward from the lid top and having a lid rim engageable with said main body rim, said lid also having a recess formed in the lid top, the recess having a side wall and an opening;
   a cap received in said recess of the lid, said cap having a cap bottom, and a cap side wall, the cap side wall having at least one section conforming to the shape of a part of the side wall of the recess, and engageable with said part of the side wall of the recess whereby, when the cap is in a lowermost position in said recess, said opening of thevrecess of the lid is closed by said cap;
   said main container body, said lid and said cap providing an enclosure for containing food to be cooked;
   said cap being movable upward relative to the lid by steam pressure;
   interengageable elements on said lid and said cap for permitting and limiting upward movement of said cap relative to said lid as a result of steam pressure in said enclosure; and
   at least one steam-releasing groove formed in one of said side wall of the recess and said cap side wall, said groove providing a oath for the release of steam from said enclosure when said cap is moved upward relative to said lid by steam pressure within said enclosure;

wherein said steam-releasing groove is formed in the side wall of the recess and is step-shaped.

7. A container for microwave oven cooking, comprising:

a main container body having a bottom and a main body side wall extending upward from said bottom, said side wall having a main body rim;

a lid having a lid top, a lid side wall extending downward from the lid top and having a lid rim engageable with said main body rim, said lid also having a recess formed in the lid ton, the recess having a side wall and an opening;

a cap received in said recess of the lid, said cap having a cap bottom, and a cap side wall, the cap side wall having at least one section conforming to the shape of a part of the side wall of the recess, and engageable with said part of the side wall of the recess whereby, when the cap is in a lowermost position in said recess, said opening of the recess of the lid is closed by said cap;

said main container body, said lid and said cap providing an enclosure for containing food to be cooked;

said cap being movable upward relative to the lid by steam pressure;

interengageable elements on said lid and said cap for permitting and limiting upward movement of said cap relative to said lid as a result of steam pressure in said enclosure; and at least one steam-releasing groove formed in one of said side wall of the recess and said can side wall, said groove providing a path for the release of steam from said enclosure when said can is moved upward relative to said lid by steam pressure within said enclosure;

said container also comprising interengageable elements on said main container body and said lid for permitting and limiting upward movement of said lid relative to said main container body as a result of steam pressure in said enclosure, said main container body and said lid providing a gap for the release of steam when said lid is moved upward relative to said main container body.

8. A container for microwave oven cooking as claimed in claim 7, in which said main body rim comprises a shoulder extending laterally from said main body side wall, and a wall section extending upward from the shoulder at a location spaced laterally from said main body side wall, and in which said rim of the lid comprises a shoulder-engaging section engageable with said shoulder of the main body rim.

9. A container for microwave oven cooking, comprising:

a main container body having a bottom and a main body side wall extending upward from said bottom, said side wall having a main body rim;

a lid having a lid top, a lid side wall extending downward from the lid top and having a lid rim engageable with said main body rim, said lid also having a recess formed in the lid top, the recess having a side wall and an opening;

a cap received in said recess of the lid, said cap having a cap bottom, and a cap side wall, the cap side wall having at least one section conforming to the shape of a cart of the side wall of the recess, and engageable with said Part of the side wall of the recess whereby, when the cap is in a lowermost position in said recess, said opening of the recess of the lid is closed by said cap;

said main container body, said lid and said cap providing an enclosure for containing food to be cooked;

said cap being movable upward relative to the lid by steam pressure;

interengageable elements on said lid and said cap for permitting and limiting upward movement of said cap relative to said lid as a result of steam pressure in said enclosure; and at least one steam-releasing groove formed in one of said side wall of the recess and said cap side wall, said groove providing a oath for the release of steam from said enclosure when said cap is moved upward relative to said lid by steam pressure within said enclosure;

in which said main body rim comprises a shoulder extending laterally from said main body side wall, and a wall section extending upward from the shoulder at a location spaced laterally from said main body side wall, in which said rim of the lid comprises a shoulder-engaging section engageable with said shoulder of the main body rim, and in which said wall section has a first lateral projection, and said lid has a second lateral projection underlying said first lateral projection, and spaced therefrom by a distance permitting limited upward movement of said lid relative to said main container body as a result of steam pressure in said enclosure, said main container body said lid providing a gap for the release of steam when said lid is moved upward relative to said main container body.

10. A container for microwave oven cooking, comprising:

a main container body having a bottom and a main body side wall extending upward from said bottom, said side wall having a main body rim;

a lid having a lid top, a lid side wall extending downward from the lid top and having a lid rim engageable with said main body rim, said lid also having a recess formed in the lid top, the recess having a side wall and an opening;

a cap received in said recess of the lid, said cap having a cap bottom, and a cap side wall, the cap side wall having at least one section conforming to the shape of a Part of the side wall of the recess, and engageable with said Part of the side wall of the recess whereby, when the cap is in a lowermost position in said recess, said opening of the recess of the lid is closed by said cap;

said main container body, said lid and said cap providing an enclosure for containing food to be cooked;

said cap being movable upward relative to the lid by steam pressure;

interengageable elements on said lid and said cap for permitting and limiting upward movement of said cap relative to said lid as a result of steam pressure in said enclosure; and at least one steam-releasing groove formed in one of said side wall of the recess and said cap side wall, said groove providing a oath for the release of steam from said enclosure when said cap is moved upward relative to said lid by steam pressure within said enclosure;

in which the bottom of said cap is concave when viewed from the bottom.

* * * * *

UNITED STATES PATENT AND TRADEMARK OFFICE
CERTIFICATE OF CORRECTION

PATENT NO. : 7,090,090 B2
APPLICATION NO. : 10/806200
DATED : August 15, 2006
INVENTOR(S) : Yoshio Ohyama Page 1 of 1

It is certified that error appears in the above-identified patent and that said Letters Patent is hereby corrected as shown below:

Column 8, claim 6, line 65, "oath" should read --path--;

Column 9, claim 7, line 10, "ton" should read --top--;

Column 9, claim 7, lines 29 and 31, "can" should read --cap--.

Signed and Sealed this

Twenty-first Day of November, 2006

JON W. DUDAS
*Director of the United States Patent and Trademark Office*